(12) United States Patent
Jain et al.

(10) Patent No.: US 11,514,069 B1
(45) Date of Patent: Nov. 29, 2022

(54) AGGREGATION OF CONTEXTUAL DATA AND INTERNET OF THINGS (IOT) DEVICE DATA

(71) Applicant: Amazon Technologies, Inc., Seattle, WA (US)

(72) Inventors: Saral Jain, Bellevue, WA (US); Chetan Manohar Dandekar, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 871 days.

(21) Appl. No.: 15/179,892

(22) Filed: Jun. 10, 2016

(51) Int. Cl.
*H04L 67/12* (2022.01)
*H04L 67/306* (2022.01)
*G06F 16/2455* (2019.01)
*G06F 16/25* (2019.01)
*G06Q 30/06* (2012.01)
*G06F 16/21* (2019.01)
*G06F 16/28* (2019.01)

(52) U.S. Cl.
CPC .......... *G06F 16/258* (2019.01); *G06F 16/211* (2019.01); *G06F 16/2455* (2019.01); *G06F 16/284* (2019.01); *G06Q 30/0631* (2013.01); *H04L 67/12* (2013.01); *H04L 67/306* (2013.01)

(58) Field of Classification Search
CPC .. G06F 16/258; G06F 16/284; G06F 16/2455; G06F 16/211; H04L 67/12; H04L 67/306; G06Q 30/0631
See application file for complete search history.

(56) References Cited

U.S. PATENT DOCUMENTS

| | | | |
|---|---|---|---|
| 2006/0265397 A1* | 11/2006 | Bryan | G06N 5/02 |
| 2008/0016440 A1* | 1/2008 | Liu | H04L 41/0266 715/700 |
| 2009/0240694 A1* | 9/2009 | Jensen | G06F 17/30 |
| 2012/0197856 A1* | 8/2012 | Banka | H04L 67/2885 707/706 |
| 2014/0279838 A1* | 9/2014 | Tsirogiannis | G06F 16/235 707/603 |
| 2016/0285979 A1* | 9/2016 | Wang | H04L 67/125 |
| 2017/0060911 A1* | 3/2017 | Loscalzo | G06F 17/30569 |
| 2017/0126577 A1* | 5/2017 | Sender | H04L 47/70 |
| 2017/0220606 A1* | 8/2017 | Wang | G06N 5/04 |

* cited by examiner

*Primary Examiner* — Cheyne D Ly
(74) *Attorney, Agent, or Firm* — Davis Wright Tremaine LLP

(57) ABSTRACT

Technology is described for processing Internet of Things (IoT) device data. IoT device data may be received from an IoT device. Contextual data that is related to the IoT device data from the IoT device may be identified. A first schema that defines the IoT device data and a second schema that defines the contextual data may be identified. A relational database that merges the IoT device data with the contextual data may be created. Knowledge of the first schema and the second schema may enable the IoT device data and the contextual data to be read and organized in the relational database.

20 Claims, 9 Drawing Sheets

AGGREGATION OF CONTEXTUAL DATA AND INTERNET OF THINGS (IOT) DEVICE DATA

BACKGROUND

The Internet of Things (IoT) is the interconnection of computing devices scattered across the globe using the existing Internet infrastructure. IoT devices may be assigned a unique identifier, such as an Internet Protocol version 6 (IPv6) address, an IPv4 address, a uniform resource identifier (URI), or a global unique identifier. IoT devices may be able to capture IoT device data, and then securely communicate the IoT device data over a network to other computing devices or a centralized server computer. In one example, the centralized server computer may perform various analytics on the IoT device data. For example, the centralized server computer may analyze streaming IoT device data and trigger alerts based on the analysis of the streaming IoT device data.

IoT devices may be embedded in a variety of physical objects or products, such as home appliances, manufacturing devices, industrial printers, automobiles, thermostats, smart traffic lights, vehicles, buildings, etc. These physical objects may have embedded electronics, software, sensors, and network connectivity that enables these physical objects to collect and exchange data. IoT may be useful for a number of applications, such as environmental monitoring, farming, infrastructure management, industrial applications, building and home automation, energy management, medical and healthcare systems, transport systems, etc.

DETAILED DESCRIPTION

Figure 1:
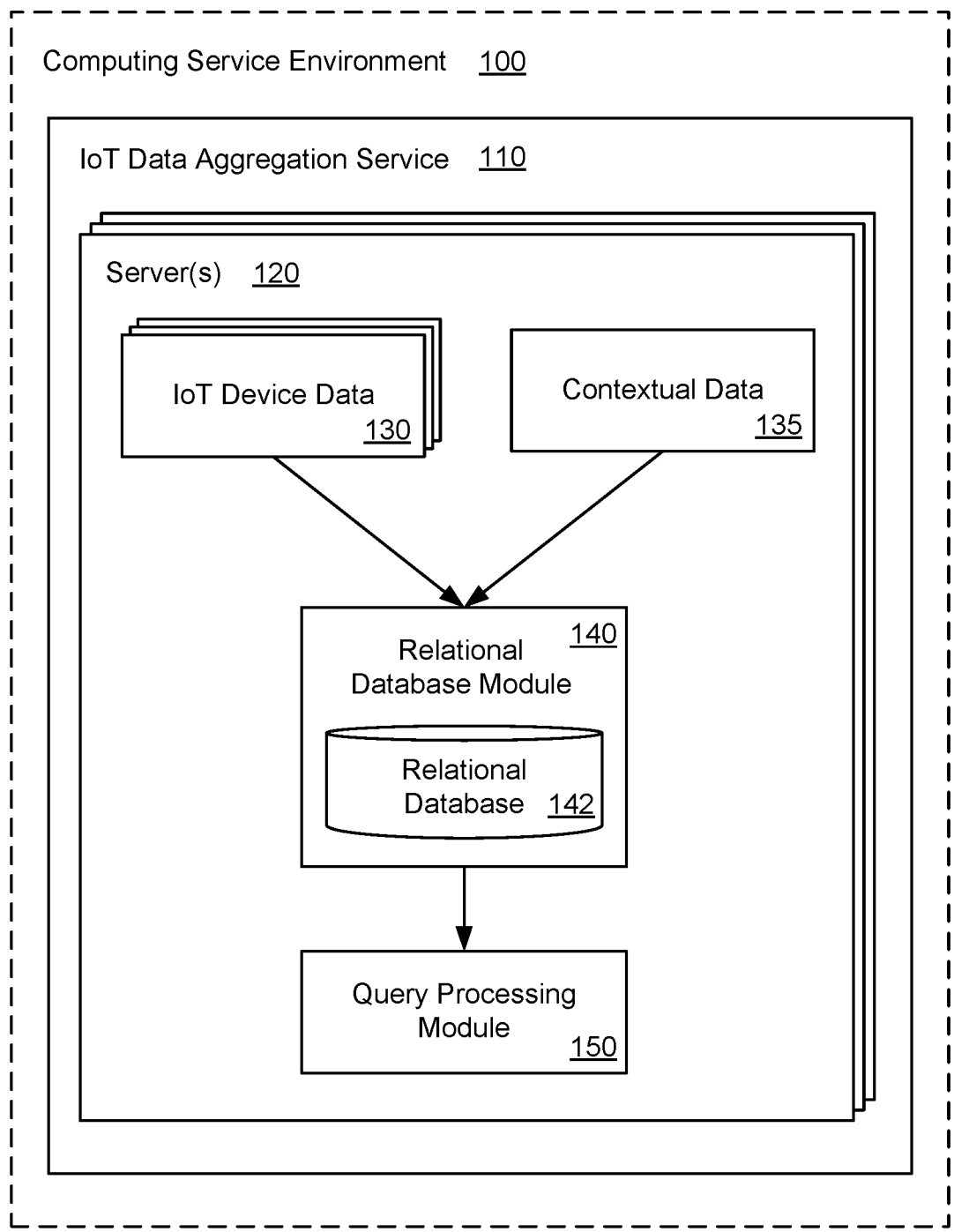
FIG. 1 illustrates a system and related operations for data aggregation using Internet of Things (IoT) device data that is merged with contextual data according to an example of the present technology.

A technology is described for merging Internet of Things (IoT) device data with contextual data in a relational database, and performing queries against the merged data in the relational database. A server may receive IoT device data from an IoT device. The IoT device data may be periodically received from the IoT device data as a data stream. The IoT device data may be defined in accordance with a first schema. In other words, the first schema may define various fields, entries, parameters, etc. in the IoT device data received from the IoT device. In addition, the IoT device data may be tagged with a context tag. The context tag may describe or characterize the contents of the IoT device data.

In one example, the server may identify contextual data that is related to the IoT device data. More specifically, the server may identify contextual data that is related to the context tag associated with the IoT device data. The contextual data may be identified from a data store containing contextual data related to a plurality of different context tags. In addition, the contextual data may be defined in accordance with a second schema. Similar to the first schema, the second schema may define various fields, entries, parameters, etc. of the contextual data.

In one example, the server may determine that rights to use the contextual data belong to a third party vendor. In this case, the server may provide access to the contextual data to a user account associated with the IoT device. In other words, a user associated with the IoT device may be presented with an option to access the contextual data. If the contextual data is accessed, the server may receive an indication that the contextual data is accessed from the user account associated with the IoT device. In one example, the server may provide the contextual data for sale and if the contextual data is purchased, the server may receive such an indication.

In one example, the server may create a relational database that merges or joins the IoT device data with the contextual data. The server may create the relational database to include the contextual data when the contextual data is granted access (e.g., purchased), or alternatively, the server may create the relational database to include the contextual data when the contextual data is not granted access. The relational database may organize the IoT device data and the contextual data into one or more tables of columns and rows. In addition, the server may create the relational database based on knowledge of the first schema and the second schema. In other words, the knowledge of the first schema and the second schema may enable the server to read the IoT device data and the contextual data, respectively, and organize the IoT device data and the contextual data in the relational database. The knowledge of the first schema may be received directly from the user associated with the IoT device, or alternatively, the knowledge of the first schema may be inferred by the server based on the formatting of the data or the context tag associated with the IoT device data and/or a type of IoT device. The knowledge of the second schema may be received directly from the third party vendor associated with the contextual data.

In one example, a query related to the IoT device data in the relational database may be received at the server. For example, the query may be received from the user associated with the IoT device via a unified query interface. The unified query interface may enable query submissions against the IoT device data merged with the contextual data in the relational database.

In one example, the server may retrieve query data from the relational database. The query data may be retrieved based on the query (or operator) performed against the relational database. The query data may be analyzed to provide a contextual output to the user associated with the IoT device. The contextual output may refer to analyzed query data results that factor the contextual data in addition to the IoT device data. The type of analysis performed on the query data may be specified by the user associated with the IoT device. For example, the query data may be analyzed to detect patterns, correlations, anomalies, etc. The user associated with the IoT device may utilize the contextual output to make a wide variety of decisions related to business, marketing, engineering, manufacturing, production, design, etc.

FIG. 1 illustrates an example of a system and related operations for data aggregation using Internet of Things (IoT) device data 130 that is merged with contextual data 135. An IoT data aggregation service 110 may operate in a computing service environment 100. The IoT data aggregation service 110 may operate one or more servers 120. The server 120 may identify IoT device data 130. The IoT device data 130 may be received from a plurality of IoT devices (e.g., tractors, sprinklers, temperature sensors, water sensors, etc.). The IoT device data 130 may include sensor data, data generated at the device from analysis, data aggregated at the device and/or device state data. In addition, the server 120 may identify contextual data 135. The contextual data 135 may correspond or be related to the IoT device data 130. For example, the IoT device data 130 may be associated with a context tag that describes the contents of the IoT device data 130, and the server 120 may identify the contextual data 135 that matches or corresponds to the context tag. In some configurations, the context for the IoT device data may be detected when the data is received and a context tag may be assigned using automated context detection.

In one example, the IoT device data 130 and the contextual data 135 may be provided to a relational database module 140 of the server 120. The relational database module 140 may create a relational database 142 that merges the IoT device data 130 with the contextual data 135. The relational database module 140 may create the relational database 142, such that the IoT device data 130 and the contextual data 135 may be organized into one or more tables of columns and rows. The relational database module 140 may create the relational database 142 based on knowledge of a first schema associated with the IoT device data 130, knowledge of a second schema associated with the contextual data 135 and a knowledge of a relationship between the IoT device data 130 and the contextual data 135. In other words, the knowledge of the first schema and the second schema may enable the relational database module 140 to read the IoT device data 130 and the contextual data 135, respectively, and organize the IoT device data 130 and the contextual data 135 in the relational database 142.

In one example, a query processing module 150 may perform queries against the relational database 142. For example, the query processing module 150 may perform queries involving a union operator, intersection operator, difference operator, Cartesian product operator (or cross join operator), selection (or restriction) operator, projection operator, join operator, relational divisional operator, etc. The query processing module 150 may retrieve query data from the relational database 142 based on the query, and the query data may be analyzed to provide a contextual output in the query results. The contextual output may be provided to the user associated with the IoT device data 130.

Figure 2:
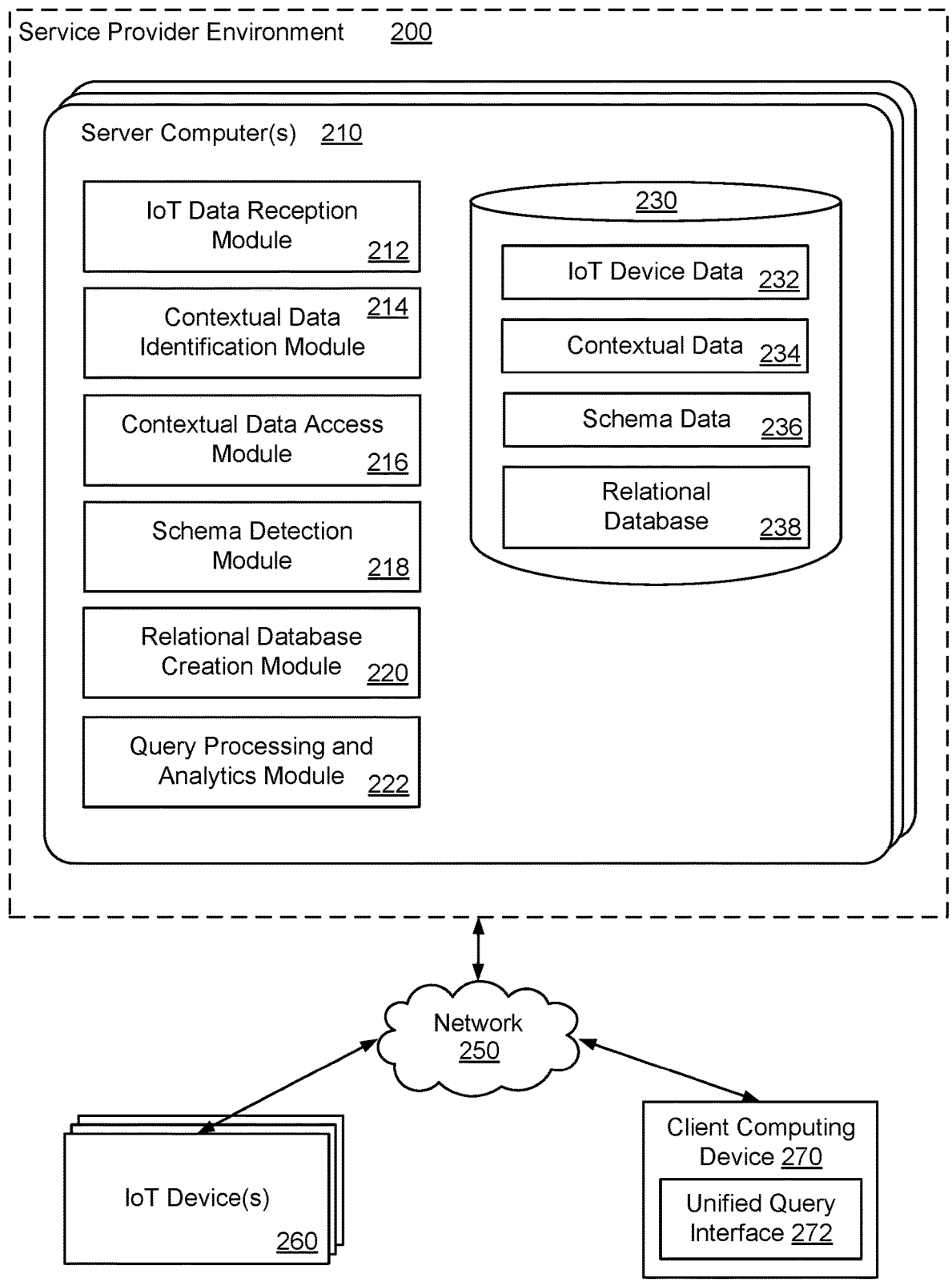
FIG. 2 is an illustration of a networked system for data aggregation using Internet of Things (IoT) device data that is merged with contextual data according to an example of the present technology.

FIG. 2 illustrates components of an example service provider environment 200 according to one example of the present technology. The service provider environment 200 may include a server computer 210. The server computer 210 may be in communication with a number of Internet of Things (IoT) devices 260 via a network 250. The server computer 210 may be in communication with a client computing device 270 that includes a unified query interface 272. The client computing device 270 may be associated with the IoT devices 260. The server computer 210 may contain a data store 230 and a number of modules for performing data aggregation using Internet of Things (IoT) device data 232 that is merged with contextual data 234.

The data stored in the data store 230 may include IoT device data 232. The IoT device data 232 may include sensor data, data generated at the device from analysis, data aggregated at the device and/or device state data. The IoT device data 232 may be defined using a JavaScript Object Notation (JSON) format, but payloads in the IoT device data 232 may not be limited to the JSON format and may use other formats as desired. The IoT device data 232 may be periodically received from the IoT devices 260 as a data stream. For example, the IoT device data 232 may be received every minute, every hour, twice a day, once a day, once a week, etc. from a particular IoT device 260. The IoT device data 232 may relate to a wide variety of information including, but not limited to, temperature, humidity, velocity, acceleration, light, sound, device state, etc. Each transmission of the IoT device data 232 may be a size ranging from several bytes to several hundred kilobytes, but the size of each IoT device data transmission is not intended to be limited to this range. In one configuration, the IoT device data 232 may be tagged with a context tag, and the context tag may describe or characterize the contents of the IoT device data 232. The context tag may explicitly be provided by the IoT device 260 when the IoT device data is sent, or the context tag may be automatically inferred when the schema of the data is detected using machine learning, pattern matching and similar processes. Alternatively, the context of the IoT device data 232 may be identified and used without adding an explicit context tag.

The data stored in the data store 230 may include contextual data 234. The contextual data 234 may be associated with a plurality of third party vendors. For example, a first third party vendor may own a first type of contextual data 234, a second third party vendor may own a second type of contextual data 234, and so on. The contextual data 234 may be related to a wide range of fields including, but not limited to, weather data, purchase data, crime data, traffic data, accident data, restaurant data, consumer data, etc. In addition, the contextual data 234 may be related to the IoT devices 260. For example, the contextual data 234 may include capabilities, performance history, maintenance information, user manuals, etc. associated with the IoT devices 260.

The data stored in the data store 230 may also include schema data 236. The schema data 236 may describe many possible schemas including a first schema associated with the IoT device data 232 and a second schema associated with the contextual data 234. More specifically, the schema data 236 may include a description of various fields, entries, parameters, etc. associated with the IoT device data 232 and the contextual data 234, respectively. In other words, the schema data 236 may enable the contents in the IoT device data 232 to be understandable. Similarly, the schema data 236 may enable the contents in the contextual data 234 to be understandable. Without the schema data 236 that describes the first scheme and the second scheme, the contents in the IoT device data 232 and the contextual data 234 may not be understandable. As a non-limiting example, the IoT device data 232 may include three fields related to temperature, moisture and light, but without the schema data 236, a temperature field may be indistinguishable from a moisture field, and so on.

The data stored in the data store 230 may include a relational database 238. The relational database 238 may merge or combine the IoT device data 232 and the contextual data 234 by associating the IoT device data 232 with a context defined by matching or appropriate contextual data. More specifically, the relational database 238 may organize the IoT device data 232 and the contextual data 234 into one or more tables of columns (e.g., fields) and rows (e.g., records). The relational database 238 may enable a collection of data items to be organized as a set of formally-described database tables, from which data may be accessed or reassembled in a plurality of ways without reorganizing the database tables. The relational database 238 may be created using structured query language (SQL), which is the standard for database interoperability.

The server computer 210 may include an IoT data reception module 212, a contextual data identification module 214, a contextual data access module 216, a schema detection module 218, a relational database creation module 220, a query processing and analytics module 222, and other applications, services, processes, systems, engines, or functionality not discussed in detail herein. The IoT data reception module 212 may be configured to receive the IoT device data 232 from the IoT device 260 via the network 250. More specifically, the IoT data reception module 212 may receive the IoT device data 232 from a transceiver or in packets sent over a network associated with the IoT device 260. The IoT data reception module 212 may receive the IoT device data 232 from the IoT device 260 in accordance with a defined periodicity (e.g., hourly, daily, weekly, monthly). In addition, the client computing device 270 may configure the IoT devices 260 to periodically transmit the IoT device data 232 to the IoT data reception module 212 of the server computer 210.

The contextual data identification module 214 may be configured to identify contextual data 234 for the client computing device 270, and the contextual data 234 may be related to the IoT device data 232. The contextual data identification module 214 may identify the contextual data 234 based on the context tag or identified context associated with the IoT device data 232. In other words, the context or context tag associated with the IoT device data 232 may correspond or match with the contextual data 234 selected at the contextual data identification module 214. In one example, the contextual data identification module 214 may identify the contextual data 234 based on preferences of other customers. For example, when a majority of users merge a certain type of IoT device data 232 (e.g., soil moisture measurements) with a certain type of contextual data 234 (e.g., weather data), the contextual data 234 may be identified for the client computing device 270. In one example, the contextual data identification module 214 may identify the contextual data 234 based on an explicit request for the contextual data 234 from the client computing device 270.

The contextual data access module 216 may be configured to provide access to the contextual data 234 to the client computing device 270. For example, based on the relation between the contextual data 234 and the IoT device data 232, the contextual data access module 216 may recommend the contextual data 234 to the client computing device 270 for purchase. If the contextual data 234 is accessed by the client computing device 270, then the contextual data access module 216 may receive an indication of the access from the client computing device 270. An access cost (e.g., purchase cost) associated with the contextual data 234 may be set by a third party vendor associated with the contextual data 234, and the access cost may be enforced by the contextual data access module 216. In one example, the contextual data access module 216 may facilitate an auction for the sale of contextual data 234 between multiple potential buyers. In another example, the contextual data access module 216 may set an initial access cost, but evaluate counteroffers received from the client computing device 270.

The schema detection module 218 may be configured to detect the schema data 236 associated with the IoT device data 232 and/or the contextual data 234. As previously described, the schema data 236 may describe a first schema associated with the IoT device data 232 and a second schema associated with the contextual data 234. In one example, the schema detection module 218 may receive the schema data 236 for the first schema directly from the client computing device 270. In other words, the client computing device 270 may explicitly describe the various fields, parameters, entries, etc. in the IoT device data 232 to the schema detection module 218. Alternatively, the schema detection module 218 may infer the schema data 236 for the first schema based on historical IoT device data received from the IoT device 260, a type of IoT device 260 and/or a format of the IoT device data 232. The schema detection module 218 may provide an inferred definition of the first schema to the client computing device 270, and in response, the schema detection module 218 may receive a confirmation that the inferred definition accurately describes the first schema. When there are inaccuracies in the inferred definition, the client computing device 270 may respond with information correcting the inaccuracies. In addition, the schema detection module 218 may receive schema data 236 for the second schema from the third party vendor associated with the contextual data 234 and/or infer the schema data 236 for the second scheme.

The relational database creation module 220 may be configured to create the relational database 238 that merges the IoT device data 232 and the contextual data 234. The relational database creation module 220 may create the relational database 238 when the contextual data 234 is purchased, or alternatively, without purchase of the contextual data 234. The relational database creation module 220 may create the relational database 238 based on the schema data 236 (i.e., knowledge of the first schema and the second schema). In other words, the schema data 236 may enable the relational database creation module 220 to read the IoT device data 232 and the contextual data 234, respectively, and organize the IoT device data 232 and the contextual data 234 in the relational database 238.

The query processing and analytics module 222 may be configured to receive a query from the client computing device 270 via the unified query interface 272. The unified query interface 272 may enable query submissions across multiple data sets in the relational database 238. The query may be related to the IoT device data 232 in the relational database 238. The query may be a type of operator, such as a union operator, intersection operator, difference operator, Cartesian product operator (or cross join operator), selection (or restriction) operator, projection operator, join operator, relational divisional operator, etc. The query processing and analytics module 222 may retrieve query data from the relational database 238 based on the query received from the client computing device 270. In addition, the query processing and analytics module 222 may analyze the query data to provide a contextual output. The contextual output may refer to analyzed query data results that factor the contextual data 234 in addition to the IoT device data 232. The analysis performed on the query data may be defined by the client computing device 270. For example, the query processing and analytics module 222 may perform predictive analysis, data mining, text analytics, statistical analysis, etc. on the query data. In another example, the query processing and analytics module 222 may analyze the query data may to detect patterns, correlations, anomalies, etc.

The IoT device 260 may comprise, for example a processor-based system such as a computing system. As non-limiting examples, the IoT device 260 may include consumer products (e.g., rice cookers, printers, or scanners), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over the network 250. Commercial devices may also be included in the definition of the IoT device 260, including: commercial printing presses, commercial freezers, commercial kilns, commercial mixers or other commercial equipment.

The client computing device 270 may comprise a computer system that is embodied in the form of a desktop computer, a laptop computer, mobile devices, cellular telephones, smartphones, set-top boxes, network-enabled televisions, music players, tablet computer systems, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
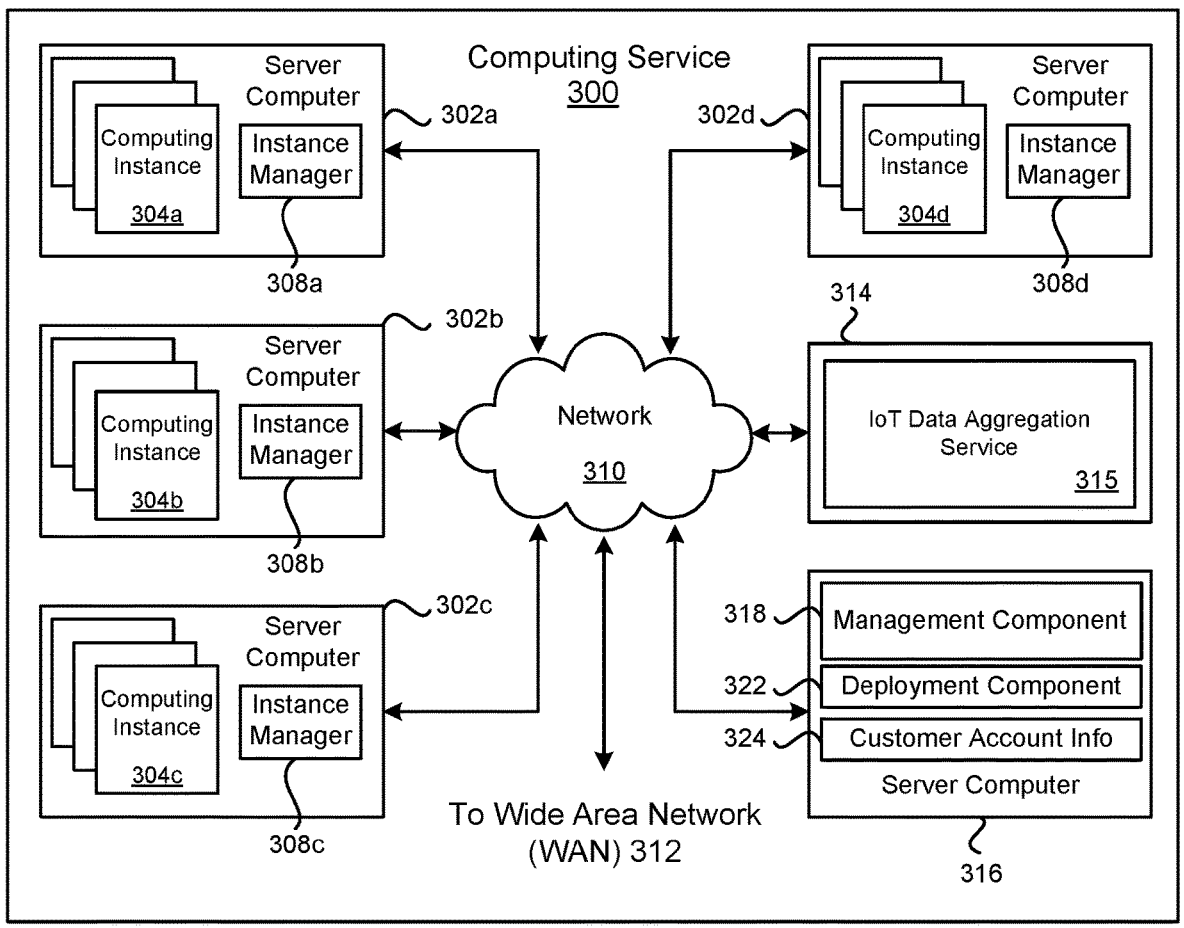
FIG. 3 is a block diagram of a computing service environment according to an example of the present technology.

FIG. 3 is a block diagram illustrating an example computing service 300 that may be used to execute and manage a number of computing instances 304a-d upon which the present technology may execute. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine manager (VMM), or another type of program configured to enable the execution of multiple computing instances 304a-d on a single server. Additionally, each of the computing instances 304a-d may be configured to execute one or more applications.

A server 314 may be reserved to execute software components for implementing the present technology or managing the operation of the computing service 300 and the computing instances 304a-d. For example, the server computer 314 may execute an Internet of Things (IoT) data aggregation service 315 operable to perform data aggregation using IoT device data that is merged with contextual data. The IoT data aggregation service 315 may receive IoT device data from an IoT device. The IoT device data may be defined using a first schema, and the IoT device data may be tagged with a context tag. The IoT data aggregation service 315 may identify contextual data that is defined using a second schema. The contextual data may be related to the context tag of the IoT device data received from the IoT device. The IoT data aggregation service 315 may provide access to the contextual data to a user account associated with the IoT device. The IoT data aggregation service 315 may receive an indication that the contextual data is accessed from the user account associated with the IoT device. The IoT data aggregation service 315 may create a relational database that merges the IoT device data with the contextual data, and the relational database may be created based on knowledge of the first schema and the second schema. The IoT data aggregation service 315 may receive a query related to the IoT device data in the relational database. The IoT data aggregation service 315 may retrieve query data from the relational database based on the query.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache is to be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the servers 302a-d. The network topology illustrated in FIG. 3 has been simplified, as many more networks and networking devices may be utilized to interconnect the various computing systems disclosed herein.

Figure 4:
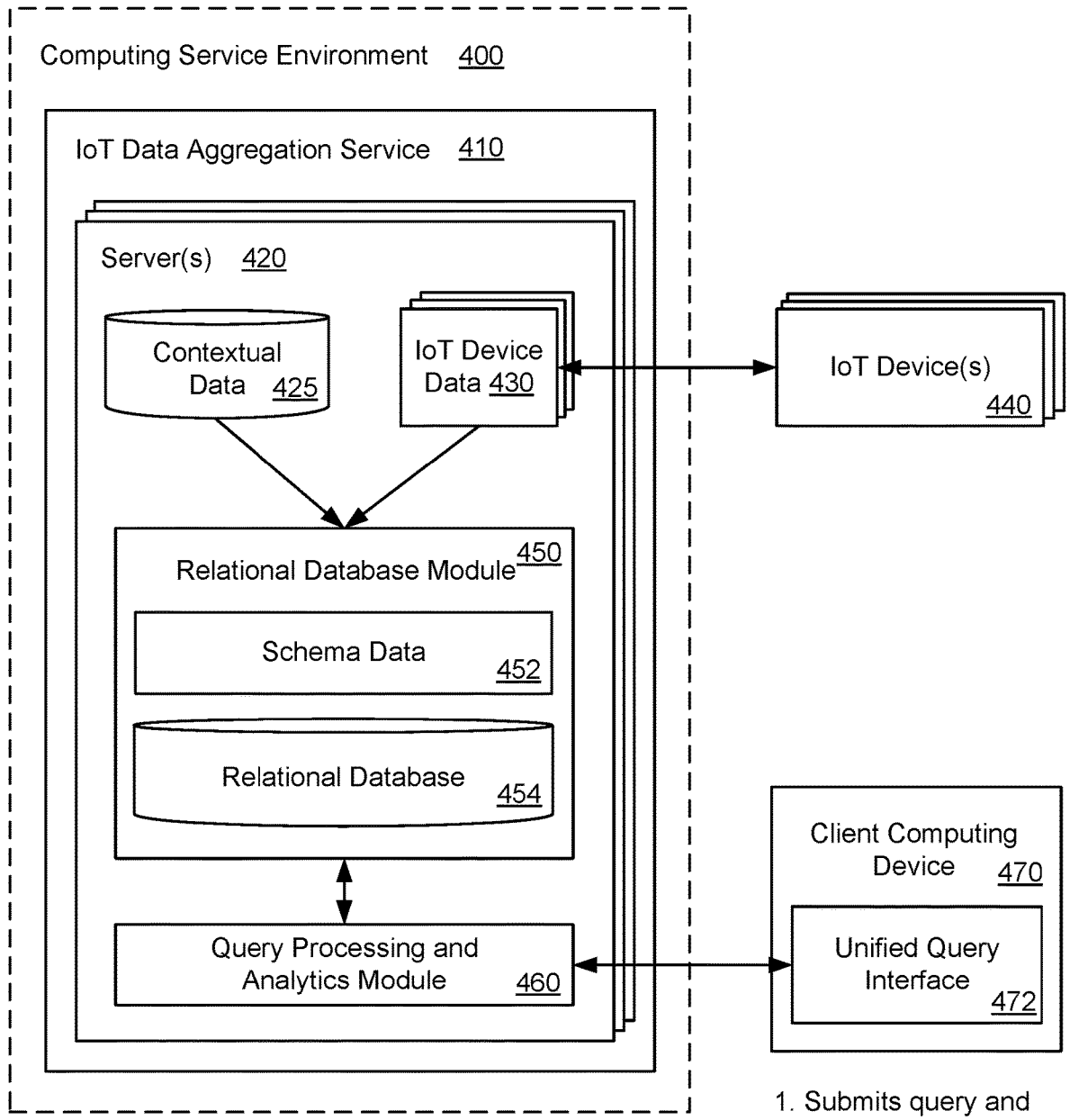
FIG. 4 illustrates a system and related operations for data aggregation using Internet of Things (IoT) device data that is merged with contextual data according to an example of the present technology.

FIG. 4 illustrates an example of a system and related operations for data aggregation using Internet of Things (IoT) device data 430 that is merged with contextual data 425. An IoT data aggregation service 410 may operate in a computing service environment 400. The IoT data aggregation service 410 may operate one or more servers 420. The server 420 may receive IoT device data 430 from a plurality of IoT devices 440 (e.g., tractors, sprinklers, temperature sensors). The IoT device data 430 may include sensor data, data generated at the device from analysis, data aggregated at the device and/or device state data. The server 420 may receive the IoT device data 430 as a data stream as the IoT device data 430 is being captured at the respective IoT device 440. The IoT device data 430 may be stored at the server 420 for a defined period of time. In addition, the IoT devices 440 may perform an authentication process with the server 420 prior to transmitting the IoT device data 430 to the server 420.

In one example, the server 420 may identify contextual data 425. The contextual data 425 may be related to the IoT device data 430. For example, the IoT device data 430 may be associated with a context tag that describes the IoT device data 430, and the server 420 may identify the contextual data 425 that matches or corresponds to the context tag. In one example, rights to use the contextual data 425 may be owned by the server 420, or alternatively, the rights to use the contextual data 425 may be owned by a third party vendor.

In one example, the IoT device data 430 and the contextual data 425 may be provided to a relational database module 450 of the server 420. The relational database module 450 may create a relational database 454 that merges the IoT device data 430 with the contextual data 425. The relational database module 450 may create the relational database 454, such that the IoT device data 430 and the contextual data 425 may be organized into one or more tables of columns and rows. The relational database module 450 may create the relational database 454 based on schema data 452 associated with the IoT device data 430 and the contextual data 425, respectively. The schema data 452 may include a description of a first schema associated with the IoT device data 430. The schema data 452 may also include a description of a second schema associated with the contextual data 425. The schema data 452 may be received from a client computing device 470, or alternatively, the schema data 452 may be inferred at the server 420. In other words, the schema data 452 may enable the IoT device data 430 and the contextual data 425 to be read, and then incorporated into the relational database 454.

In an alternative configuration, the IoT device data 430 and the contextual data 425 may be used to create a non-relational database. As non-limiting examples, the non-relational database may include a NoSQL database, NewSQL database, EXtensible Markup Language (XML) database, object oriented database, etc.

In one example, a query processing and analytics module 460 may receive a query (e.g., a SQL query) from the client computing device 470 via a unified query interface 472. The unified query interface 472 may enable query submissions across multiple data sets in the relational database 454. Based on the query received from the client computing device 470, the query processing and analytics module 460 may perform the query against the relational database 454. For example, the query processing and analytics module 460 may perform queries involving a union operator, intersection operator, difference operator, Cartesian product operator (or cross join operator), selection (or restriction) operator, projection operator, join operator, relational divisional operator, etc.

The query processing and analytics module 460 may produce query data from the relational database 454 based on the query submitted by the client computing device 470, and the query data may be analyzed to provide a contextual output to the computing device 470. The analysis of the query data may be performed in accordance with analysis criteria received from the client computing device 470. For example, the analysis criteria may instruct the query processing and analytics module 460 to perform predictive analysis, data mining, text analytics, statistical analysis, etc. on the query data. In another example, the analysis criteria may instruct the query processing and analytics module 460 to analyze the query data to detect patterns, correlations, anomalies, etc. The contextual output may enable a user associated with the client computing device 470 to make various decisions related to business, marketing, engineering, manufacturing, production, design, etc.

In one configuration, the contextual output may be compared with historical data analytics for related query data. An anomaly between the contextual output and the historical data analytics may be detected using machine learning or similar techniques. An indication of the anomaly and potential explanations for the anomaly may be provided to the client computing device 470. Therefore, based on the comparison, the client computing device 470 may determine whether the contextual output is aligned with analyses of similar query data, and if not aligned, one or more decisions may be made based on the potential explanations for the anomaly.

In one configuration, the IoT device data 430 received from the IoT device 440 may be compared with additional IoT device data received from a plurality of additional IoT devices within a defined geographical distance from the IoT device 440. When a difference between the IoT device data 430 and the additional IoT device data is above a defined threshold, an alert may be generated and transmitted to the client computing device 470. The alert may indicate that the IoT device data 430 is not aligned with IoT device data from similar IoT devices within the same geographic region, and based on the alert, one or more decisions may be made to remedy the difference.

As a non-limiting example, a plurality of IoT devices 440 (e.g., water sprinklers) may be installed in a plurality of fields in a plurality of geographic areas. IoT device data 430 (e.g., an amount of water used for irrigation) may be collected for each of the fields in the plurality of geographic regions. For a customer that operates a particular field, IoT device data 430 associated with that particular field may be compared with IoT device data 430 for other fields in the same geographic area. The customer may be alerted when the IoT device data 430 for their field does not correspond with IoT device data 430 for the other fields in the same geographic region. Therefore, the customer may be alerted of the differences in the IoT device data 430, despite the IoT devices 440 operating in the same geographic area, and the customer may make decisions based on the alert. Such comparisons may also be made on an individual IoT device basis to determine if individual devices in an array of devices are working properly.

In one configuration, the server 420 may receive multiple sets of IoT device data 430 from multiple IoT devices 440, and the multiple sets of IoT device data 430 may be merged with the contextual data 425 in the relational database 454. The query processing and analytics module 460 may receive a query from the client computing device 470, and based on the query, a subset of the multiple sets of IoT device data 430 and the contextual data 425 (i.e., query data) may be selected for further analysis. As a non-limiting example, the relational database 454 may organize three data sets (i.e., contextual data and non-contextual data). The server 420 may receive a query that is specific to a first data set out of the three data sets, or the query may be specific to a first and second data set but not a third data set (e.g., this may allow the original data to be queried which the joined context data is also in the query result), or the query may be specific to the three data sets. For example, the query may be an intersection of the three data sets or a union of the three data sets. Therefore, the query processing and analytics module 460 may include logic to interpret and/or orchestrate the query received from the client computing device 470, and retrieve corresponding query data from the relational database 454 for further analysis.

In one example, the customer may be presented with knowledge of the relational tables in the relational database 454. In other words, the customer may be notified of the organization and/or structure of the IoT device data 430 and the contextual data 425 in the relational database 454. The customer may use this knowledge when performing queries against the relational database 454. Alternatively, the customer may make queries using an original data format, and these queries may be translated into SQL queries and applied to the relational database 454.

In one configuration, the server 420 may define the first schema associated with IoT device data 430 collected at the IoT device 440. The server 420 may transmit a description of the first schema to the IoT device 440. Therefore, when the IoT device 440 collects and transmits the IoT device data 430 to the server 420, the IoT device data 430 may already be in accordance with the first schema defined at the server 420. As a result, the server 420 does not learn of the first schema from the IoT device 440, but rather the server 420 defines the first schema for the IoT device 440. The server 420 may apply its knowledge of the first schema when creating the relational database 454 that includes the IoT device data 430.

As a non-limiting example, IoT device data 430 (e.g., soil moisture measurements) may be received from the IoT devices 440 (e.g., moisture sensors used in farming). The server 420 may identify contextual data 425 (e.g., weather data) that is of relevance to the IoT device data 430. The contextual data 425 may be offered for sale to the client computing device 470 associated with the IoT devices 440.

The client computing device 470 may determine that the contextual data 425 (e.g., weather data) is of particular relevance to the IoT device data 430 (e.g., soil moisture measurements), and therefore, the contextual data 425 (e.g., weather data) may be purchased for inclusion in the relational database 454 with the IoT device data 430 (e.g., soil moisture measurements). The client computing device 470 may subsequently perform queries on the relational database 454 to retrieve query data, and then perform analytics on the query data.

As a non-limiting example, the client computing device 470 may be associated with a farming equipment rental business. The farming equipment may be coupled to IoT devices 440 (e.g., sensors). IoT device data 430 (e.g., farming equipment data) from the IoT devices 440 may be combined with contextual data 425 related to customer billing information, a customer relationship history, support documents (e.g., instruction manuals), etc. The IoT device data 430 (e.g., farming equipment data) and the contextual data 425 may be merged when creating the relational database 454, such that queries may be performed against the IoT device data 430 and the contextual data 425. As another non-limiting example, the farming equipment may be coupled to IoT devices 440, such as geolocation sensors. The IoT device data 430 (e.g., geolocation data) may be combined with the contextual data 425 in the relational database 454. As yet another non-limiting example, the client computing device 470 may be associated with a farming company that plants and develops seeds. Various types of IoT devices 440 (e.g., farming equipment) may produce IoT device data 430 (e.g., seed growth, an amount of fertilized used). In addition, contextual data 425 related to the seeds may be identified (e.g., a type of seed, historical yield for similar seeds in a similar location, weather information). The IoT device data 430 and the contextual data 425 related to the seeds may be merged in the relational database 454.

As a non-limiting example, the server 420 may receive the IoT device data 430 as a stream of data packets. Each data packet may include four fields of data—temperature, soil moisture, humidity and light (in lumens). The four fields of data may be organized in the IoT device data 430 in accordance with a first schema. A description of the first schema may be included in the schema data 452. After receipt of the data packet, the server 420 may understand and distinguish between the four fields in the data packet based on the schema data 452. In other words, the schema data 452 may aid the server 420 in interpreting the four fields in the IoT device data 430. Further, the server 420 may utilize the schema data 452 when organizing the IoT device data 430 in the relational database 454.

Moreover, in the IoT data field, there is no present standardization of data formats or protocols. Rather, users may define their own format based on the schema utilized for the IoT device data 430. For example, the oil industry may use a first type of format for oil pipeline data, the farming industry may use a second type of format for farming data, etc. Since the schema may be customized for the type of IoT device data 430, the schema data 452 may be provided to the server 420, such that the server 420 is able to read and interpret the various data fields in the IoT device data 430.

In one example, the server 420 may receive IoT device data 430 from a first IoT device, a second IoT device and a third IoT device. The IoT device data 430 received from the first IoT device may be associated with schema A. The IoT device data 430 received from the second IoT device may be associated with schema B. The IoT device data 430 received from the third IoT device may be associated with schema C. In addition, the server 420 may identify a first set of contextual data associated with schema D and a second set of contextual data associated with schema E. The server 420 may identify schema data 452 for each of the three IoT device data streams, as well as the two sets of contextual data. Based on the schema data 452, the server 420 may merge the three IoT device data streams with the two sets of contextual data into one or more tables in the relational database 454.

As a non-limiting example, IoT device data 430 (e.g., engine performance measurements) may be received from the IoT device 440 (e.g., an oxygen sensor in proximity to an engine). In addition, contextual data 425 may be identified that is related to the IoT device data 430 and/or the IoT device 440. For example, the contextual data 425 may include a type of engine, a location in which the engine is performing, a maintenance history of the engine, a type of engine oil utilized by the engine, etc. The contextual data 425 may be merged with the IoT device data 430 in the relational database 454. The client computing device 470 may query data from the relational database 454, and then define various analytics to perform on the query data related to engine performance. For example, machine learning models may be applied to the query data to detect anomalies in the query data. As another example, the query data may be analyzed to predict an expected maintenance for the engine.

As a non-limiting example, IoT device data 430 (e.g., electrical metering data from a plurality of locations) may be merged with contextual data 425 (e.g., historical electrical metering data) in the relational database 454. The unified query interface 472 may support a wide range of query submissions against the relational database 454. The query data retrieved from the relational database 454 may be analyzed in a variety of manners depending on the use case. For example, if the query data indicates a high load, then the user may be warned of a potential failure that is expected in the electrical grid. As another example, the query data may be used for business reporting. As yet another example, the query data may be analyzed to determine electrical usage in different locations.

As a non-limiting example, retail shopping centers may include IoT devices 440 that collect IoT device data 430 related to a particular customer. For example, the IoT device data 430 may indicate particular products viewed by the customer, a period of time the customer spent viewing particular products, etc. The IoT device data 430 collected for the customer may be linked to an electronic profile associated with the customer. The electronic profile may incorporate the various interests of the customer (as indicated by the IoT device data 430), and electronic retailers may offer products for sale to the customer based on the customer's electronic profile.

Figure 5:
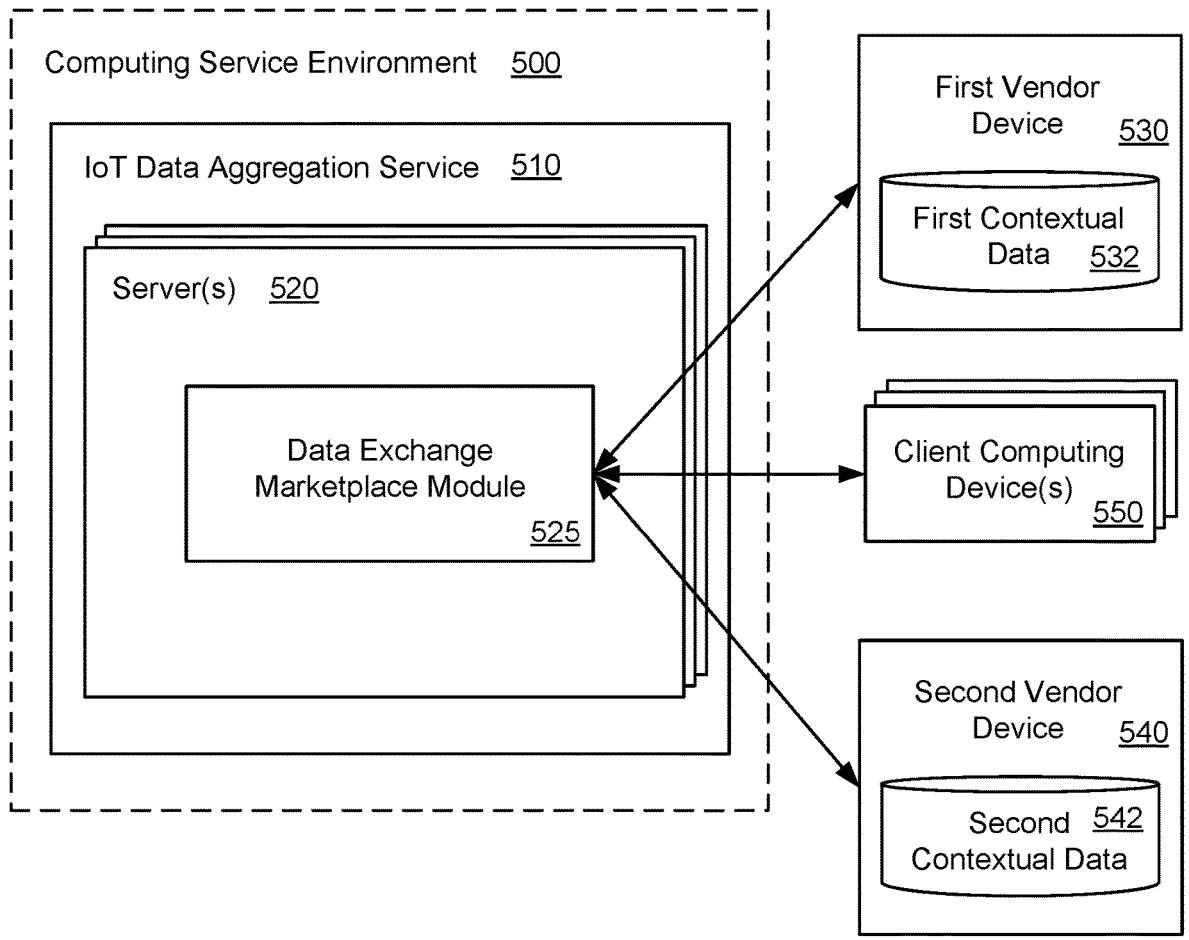
FIG. 5 illustrates a system and related operations for facilitating an electronic marketplace that supports a buying and selling of contextual data between multiple entities according to an example of the present technology.

FIG. 5 illustrates an example of a system and related operations for facilitating an electronic marketplace that supports a buying and selling of contextual data between multiple entities. An IoT data aggregation service 510 may operate in a computing service environment 500. The IoT data aggregation service 510 may operate one or more servers 520. The server 520 may execute a data exchange marketplace module 525 configured to facilitate the buying and selling of contextual data between multiple entities.

In one configuration, the data exchange marketplace module 525 may be in communication with a first vendor device 530 and a second vendor device 540. The first vendor device 530 may be associated with first contextual data 532 and the second vendor device 540 may be associated with second contextual data 542. In one example, the data exchange marketplace module 525 may identify IoT device data associated with a client computing device 550, and based on the IoT device data, the data exchange marketplace module 525 may determine that the first contextual data 532 and/or the second contextual data 542 is relevant to the IoT device data associated with the client computing device 550. The data exchange marketplace module 525 may recommend for sale the first contextual data 532 and/or the second contextual data 542 to the client computing device 550. The data exchange marketplace module 525 may act as an intermediary to sell the first contextual data 532 and/or the second contextual data 542 to the client computing device 550.

In another configuration, the first contextual data 532 and the second contextual data 542 may both contain similar proprietary contextual data, and both the first vendor device 530 and the second vendor device 540 may attempt to sell their respective contextual data to the client computing device 550. In this configuration, the data exchange marketplace module 525 may facilitate a bidding auction between the first vendor device 530 and the second vendor device 540. The vendor device that offers a highest bid may win the opportunity to sell their contextual data to the client computing device 550.

Figure 6:
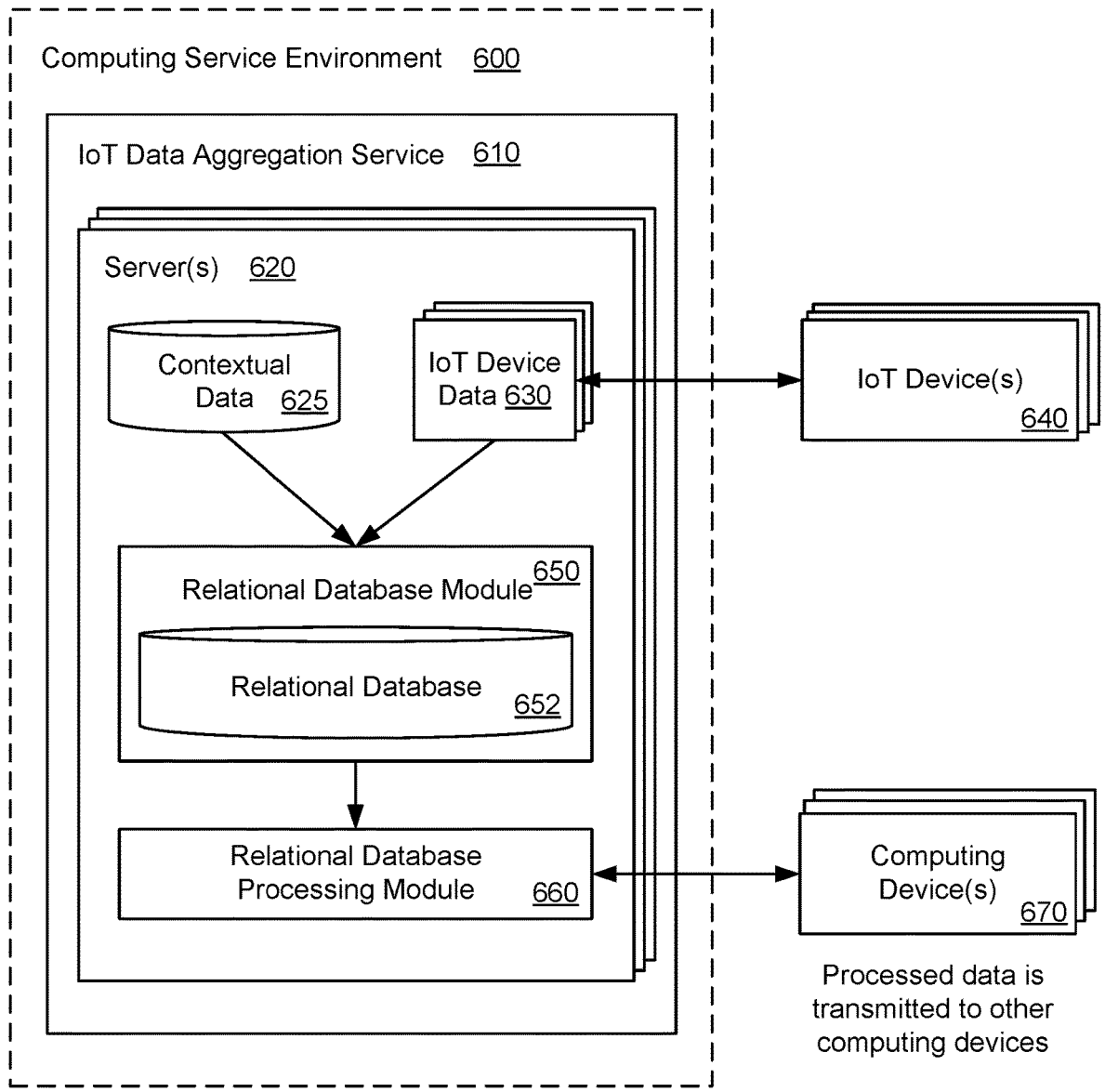
FIG. 6 illustrates a system and related operations for analyzing Internet of Things (IoT) device data merged with contextual data and providing a data analysis to a plurality of computing devices according to an example of the present technology.

FIG. 6 illustrates an example of a system and related operations for analyzing Internet of Things (IoT) device data 630 merged with contextual data 625 and providing a data analysis to a plurality of computing devices 670. An IoT data aggregation service 610 may operate in a computing service environment 600. The IoT data aggregation service 610 may operate one or more servers 620. The server 620 may receive IoT device data 630 from a plurality of IoT devices 640. The server 620 may identify contextual data 625 that is related to the IoT device data 630. The IoT device data 630 and the contextual data 625 may be provided to a relational database module 650. The relational database module 650 may create a relational database 652 that merges the IoT device data 630 and the contextual data 625.

In one configuration, a relational database processing module 660 may perform a defined data query on the relational database 652. In addition, the relational database processing module 660 may perform predefined analytics on the data query. The defined data query and the predefined analytics may be set by a user associated with the IoT device data 630. In other words, the user may predefine various types of analyses to perform on the query data extracted from the relational database 652. The analytics performed on the data query may result in a contextual output (i.e., analysis results that factor the contextual data 625). The contextual output may be provided to the plurality of computing devices 670. Therefore, the plurality of computing devices 670 may utilize the contextual output derived from the IoT device data 630.

As a non-limiting example, the IoT device data 630 (e.g., harvest data) may be analyzed (along with contextual data 625) to determine whether a harvest of crops is ready. The IoT devices 640 (e.g., sensors) that collect and transmit the IoT device data 630 (e.g., harvest data) may be spread across a plurality of different fields within a geographic region. The analysis of whether the harvest is ready may be transmitted to the computing devices 670 (e.g., vehicles). Based on this information, the computing devices 670 (e.g., vehicles) may create an optimized route for visiting fields within the geographic region in which the harvest of the crops is ready.

Figure 7:
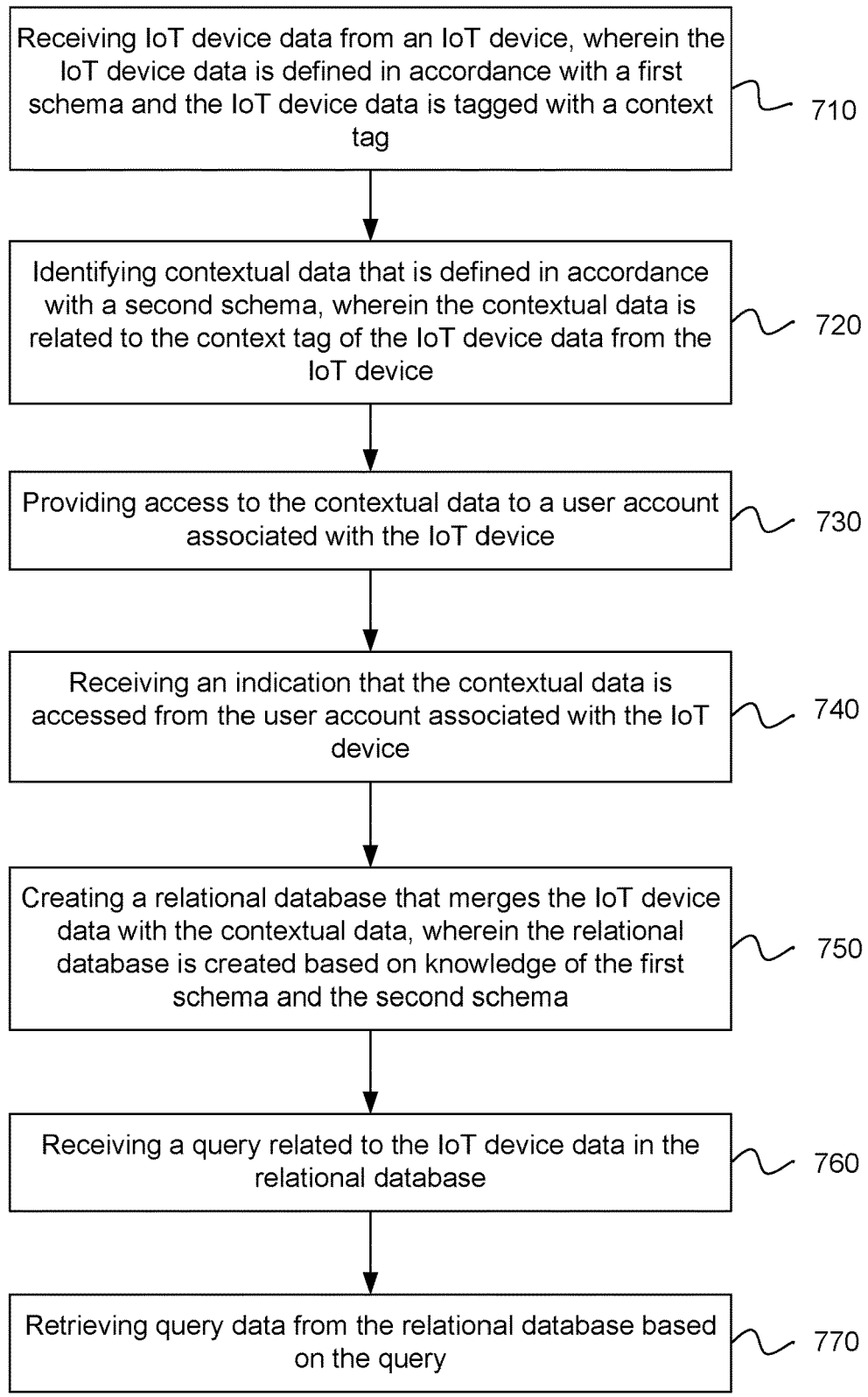
FIG. 7 is a flowchart of an example method for data aggregation using Internet of Things (IoT) device data that is merged with contextual data.

FIG. 7 illustrates an example of a method for data aggregation using Internet of Things (IoT) device data that is merged with contextual data. IoT device data may be received from an IoT device at a server, as in block 710. The IoT device data may be defined in accordance with a first schema. In other words, the first schema may define a structure of the IoT device data. In addition, the IoT device data may be tagged with a context tag. The context tag may describe or characterize the IoT device data.

Contextual data that is defined in accordance with a second schema may be identified, as in block 720. The second schema may define a structure of the contextual data. The contextual data may be related to the context tag of the IoT device data received from the IoT device. In other words, contextual data that matches the context tag of the IoT device data may be identified from a context database.

Access to the contextual data may be provided to a user account associated with the IoT device, as in block 730. For example, since a user associated with the IoT device may be interested in accessed the contextual data due to the relationship between the IoT device data produced by the IoT device and the contextual data, the user associated with the IoT device may be offered access to the contextual data via the user account.

An indication that the contextual data is accessed may be received from the user account associated with the IoT device, as in block 740. For example, a user associated with the IoT device may decide to purchase the contextual data due to the relationship between the IoT device data produced by the IoT device and the contextual data. When the contextual data is accessed, the indication of the access may be provided from the user account to the server.

A relational database may be created that merges the IoT device data with the contextual data, as in block 750. The relational database may be created based on knowledge of the first schema and the second schema. Knowledge of the first schema associated with the IoT device data may be received from the user account associated with the IoT device. Knowledge of the second schema associated with the contextual data may be received from a vendor associated with the contextual data.

A query related to the IoT device data in the relational database may be received, as in block 760. The query may be received at the server from a unified query interface on a client device. In other words, the unified query interface may enable users to perform queries against the relational database that includes the IoT device data merged with the context data.

Query data may be retrieved from the relational database based on the query, as in block 770. In other words, the query data may be extracted from the relational database that includes the IoT device data merged with the context data. The query data may pertain to a portion of the IoT device data and/or a portion of the context data in the relational database. The query data may be analyzed to provide a contextual output. For example, the query data may be analyzed to detect patterns, unknown correlations, anomalies, market trends, customer preferences, etc.

In one example, the first schema associated with the IoT device data may be inferred based on at least one of: historical IoT device data received from the IoT device, a type of IoT device, or a format of the IoT device data. An inferred definition of the first schema may be provided to the user account associated with the IoT device. A confirmation that the inferred definition accurately describes the first schema may be received. Knowledge of the first schema used to create the relational database may be based on the inferred definition of the first schema.

Figure 8:
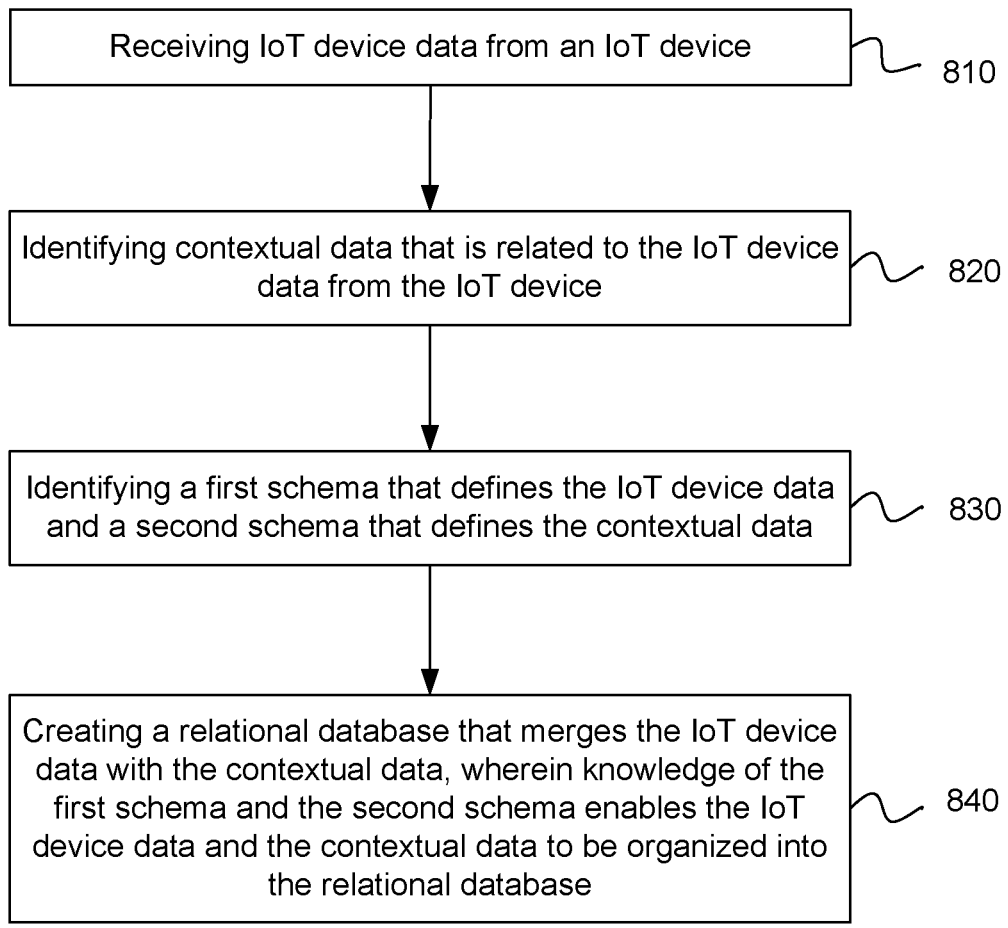
FIG. 8 is a flowchart of an example method for processing Internet of Things (IoT) device data.

FIG. 8 illustrates an example of a method for processing Internet of Things (IoT) device data. IoT device data may be received from an IoT device, as in block 810. The IoT device data may be received as a data stream from the IoT device as the IoT device data is being captured at the IoT device. The IoT device data may be tagged with a context tag. The context tag may describe or characterize the contents of the IoT device data.

Contextual data that is related to the IoT device data received from the IoT device may be identified, as in block 820. The contextual data may also be related to the IoT device. The contextual data may be identified from a contextual database based on the context tag associated with the IoT device data.

A first schema that defines the IoT device data and a second schema that defines the contextual data may be identified, as in block 830. Knowledge of the first schema may be received from the IoT device or a user associated with the IoT device. Alternatively, knowledge of the first schema may be inferred based on a type of IoT device data and/or IoT device. In addition, knowledge of the second schema may be received from a vendor associated with the contextual data.

A relational database that merges the IoT device data with the contextual data may be created, as in block 840. Knowledge of the first schema and the second schema may enable the IoT device data and the contextual data to be organized into the relational database. The IoT device data and the contextual data may be organized into one or more tables of columns and rows in the relational database.

In one example, a query related to the IoT device data in the relational database may be received. Query data may be retrieved from the relational database based on the query. The query data may be analyzed to provide a contextual output. In another example, the query may be processed against the IoT device data merged with the contextual data in the relational database via a server in a computing service environment. In yet another example, a unified query interface may be provided that enables query submissions across multiple data sets that are organized in the relational database. The multiple data sets may include the IoT device data and the contextual data.

In one example, the contextual output may be compared with historical data analytics for related query data. An anomaly between the contextual output and the historical data analytics may be detected using machine learning. An indication of the anomaly and potential explanations for the anomaly may be provided. In another example, the IoT device data received from the IoT device may be compared with additional IoT device data received from a plurality of additional IoT devices within a defined geographical distance from the IoT device. An alert may be sent when a difference between the IoT device data and the additional IoT device data is above a defined threshold.

In one example, access to the contextual data may be provided to a user account associated with the IoT device. An indication that the contextual data is accessed may be received from the user account associated with the IoT device. The relational database that merges the IoT device data with the contextual data may be created after the contextual data is accessed. In another example, an electronic marketplace may be facilitated that supports a buying and selling of contextual data between multiple entities.

In one example, one or more characteristics may be determined for the IoT device data received from the IoT device. Additional contextual data may be identified that corresponds to the one or more characteristics of the IoT device data. The additional contextual data may be recommended to a user account associated with the IoT device. The user account may indicate a selection of the additional contextual data for incorporation into the relational database.

In one example, the first schema may be defined at the server and a description of the first schema may be transmitted to the IoT device. The IoT device may be configured to capture and transmit the IoT device data in accordance with the first schema defined at the server.

In one example, multiple sets of IoT device data may be received from multiple IoT devices. The multiple sets of IoT device data may be merged with the contextual data in the relational database. A query may be received via a unified query interface that enables query submissions across the multiple sets of IoT device data and the contextual data. A subset of the multiple sets of IoT device data and the contextual data in the relational database that corresponds to the query may be selected. The subset may be analyzed to provide a contextual output.

Figure 9:
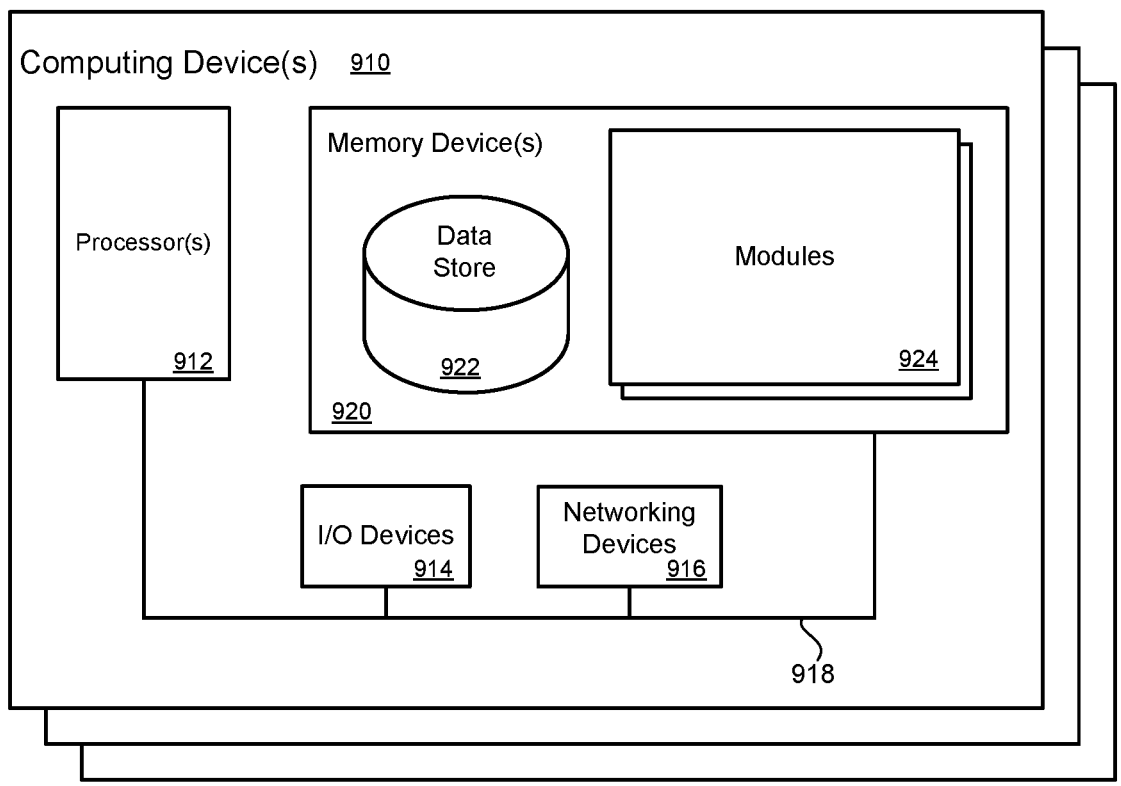
FIG. 9 is a block diagram that provides an example illustration of a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules 924 that are executable by the processor(s) 912 and data for the modules 924. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for data aggregation using Internet of Things (IoT) device data that is merged with contextual data, the method performed using one or more processors of a server and comprising:

receiving:

first IoT device data from a first IoT device, wherein the first IoT device data is defined in accordance with a first schema and the first IoT device data is tagged with a context tag; and second IoT device data from a second IoT device within a defined geographical distance from the first IoT device;

identifying contextual data that is defined in accordance with a second schema, wherein the contextual data is related to the context tag of the first IoT device data received from the first IoT device and the second IoT device data from the second IoT device;
providing access to the contextual data to a user account associated with the first IoT device;
merging the first IoT device data and the second IoT device data with the contextual data based on the first schema and the second schema;
receiving a query related to the first IoT device data and the second IoT device data;
retrieving query data based on the query;
comparing a contextual output of the query data to historical data analytics for related query data;
detecting an anomaly between the contextual output of the query data and the historical data analytics, the anomaly indicating that the contextual output is not aligned with analyses of similar query data from the historical data analytics;
based on the anomaly, comparing the first IoT device data with the second IoT device data; and
sending an alert when a difference between the first IoT device data and the second IoT device data is above a threshold.

2. The method of claim 1, further comprising analyzing the query data to provide the contextual output of the query data.

3. The method of claim 1, further comprising:
receiving the first schema associated with the first IoT device data received from the user account associated with the first IoT device; and
receiving the second schema associated with the contextual data from a vendor associated with the contextual data.

4. The method of claim 1, further comprising:
inferring the first schema associated with the first IoT device data based on at least one of: historical IoT device data received from the first IoT device, a type of IoT device, or a format of the first IoT device data;
providing an inferred definition of the first schema to the user account associated with the first IoT device; and
receiving a confirmation that the inferred definition accurately describes the first schema.

5. A method for processing Internet of Things (IoT) device data, the method comprising:
receiving first IoT device data from a first IoT device;
receiving second IoT device data from a second IoT device within a defined geographical distance from the first IoT device;
identifying contextual data that is related to both a context tag of the first IoT device data received from the first IoT device and the second IoT device data received from the second IoT device;
identifying a first schema that defines the IoT device data and a second schema that defines the contextual data, wherein the first schema is received from a user account associated with the IoT device;
merging the first IoT device data and the second IoT device data with the contextual data, wherein the first schema and the second schema enable the first IoT device data, the second IoT device data, and the contextual data to be merged;
comparing a contextual output of query data to historical data analytics for related query data;
detecting an anomaly between the contextual output of the query data and the historical data analytics;
based on the anomaly, comparing the first IoT device data with the second IoT device data; and
sending an alert when a difference between the first IoT device data and the second IoT device data is above a threshold.

6. The method of claim 5, wherein detecting the anomaly between the contextual output and the historical data analytics uses machine learning.

7. The method of claim 5, further comprising:
granting access to the contextual data to a user account associated with the first IoT device; and
receiving an indication that the contextual data is accessed from the user account associated with the first IoT device, wherein a relational database that merges the first IoT device data with the contextual data is created after the contextual data is accessed.

8. The method of claim 5, further comprising facilitating an electronic marketplace that supports a buying and selling of contextual data between multiple entities.

9. The method of claim 5, further comprising:
determining one or more characteristics of the first IoT device data received from the first IoT device;
identifying additional contextual data that corresponds to the one or more characteristics of the first IoT device data; and
recommending the additional contextual data to a user account associated with the first IoT device, wherein the user account indicates a selection of the additional contextual data for incorporation into a relational database.

10. The method of claim 5, further comprising providing a unified query interface that enables query submissions across multiple data sets, wherein the multiple data sets include the first IoT device data and the contextual data.

11. The method of claim 5, further comprising defining the first schema and transmitting a description of the first schema to the first IoT device, wherein the first IoT device is configured to capture and transmit the first IoT device data in accordance with the first schema.

12. The method of claim 5, further comprising receiving the first IoT device data as a data stream from the first IoT device as the first IoT device data is being captured at the first IoT device.

13. The method of claim 5, further comprising:
receiving multiple sets of IoT device data from multiple IoT devices, wherein the multiple sets of IoT device data are merged with the contextual data;
receiving a query via a unified query interface that enables query submissions across the multiple sets of IoT device data and the contextual data;
selecting a subset of the multiple sets of IoT device data and the contextual data that corresponds to the query; and
analyzing the subset to provide a contextual output.

14. The method of claim 5, further comprising processing queries against the first IoT device data merged with the contextual data using a server in a computing service environment.

15. A system for processing queries using Internet of Things (IoT) device data that is merged with contextual data, the system comprising:
a processor; and
a memory device including a data store to store a plurality of data and instructions that, when executed by the processor, cause the system to:
receive first IoT device data from a first IoT device, wherein the first IoT device data is defined using a first schema and the first IoT device data is tagged with a context tag;

receive second IoT device data from a second IoT device within a defined geographical distance from the first IoT device;
identify contextual data that is defined using a second schema, wherein the contextual data is related to the context tag of the first IoT device data received from the first IoT device and the second IoT device data received from the second IoT device;
merge the first IoT device data and the second IoT device data with the contextual data, based, at least in part, on the first schema and the second schema, wherein the first schema is received from a user account associated with the first IoT device;
receive a query related to the first IoT device data;
retrieve query data based on the query;
analyze the query data from the query to provide a contextual output;
compare the contextual output with historical data analytics for related query data;
detect an anomaly between the contextual output of the query data and the historical data analytics;
based on the anomaly, compare the first IoT device data with the second IoT device data; and
send an alert when a difference between the first IoT device data and the second IoT device data is above a threshold.

16. The system of claim 15, wherein the plurality of data and instructions, when executed by the processor, cause the system to:
provide access to the contextual data to a user account associated with the first IoT device; and
receive an indication that the contextual data is accessed from the user account associated with the first IoT device, wherein a relational database that merges the first IoT device data with the contextual data is created after the contextual data is accessed.

17. The system of claim 15, wherein the plurality of data and instructions, when executed by the processor, cause the system to:
infer the first schema associated with the first IoT device data based on at least one of: historical IoT device data received from the first IoT device, a type of IoT device, or a format of the first IoT device data.

18. The system of claim 15, wherein the plurality of data and instructions, when executed by the processor, cause the system to: provide a unified query interface that enables query submissions across multiple data sets, wherein the multiple data sets include the first IoT device data and the contextual data.

19. The system of claim 15, wherein machine learning is used by the system to detect the anomaly between the contextual output and the historical data analytics.

20. The method of claim 5, wherein the context tag is assigned to the contextual data of the first IoT device using automated context detection, the context tag causing the first IoT device to be identified within the second schema.

* * * * *